United States Patent
Kutchey

[19]

[11] Patent Number: 6,155,598
[45] Date of Patent: Dec. 5, 2000

[54] SIDE IMPACT AIR BAG

[75] Inventor: Michael B. Kutchey, Rochester Hills, Mich.

[73] Assignee: TRW Vehicle Safety Systems Inc., Lyndhurst, Ohio

[21] Appl. No.: 09/387,814

[22] Filed: Sep. 1, 1999

[51] Int. Cl.[7] ................................................. B60R 21/22
[52] U.S. Cl. .................................... 280/730.2; 280/743.1
[58] Field of Search ............................ 280/743.1, 730.2, 280/730.1

[56] References Cited

U.S. PATENT DOCUMENTS

| | | |
|---|---|---|
| 5,290,061 | 3/1994 | Bollaert . |
| 5,496,061 | 3/1996 | Brown . |
| 5,586,782 | 12/1996 | Zimmermann, II et al. . |
| 5,615,909 | 4/1997 | Wipasuramonton et al. . |
| 5,765,863 | 6/1998 | Storey et al. . |
| 5,829,779 | 11/1998 | Nakashima et al. ................ 280/730.2 |
| 5,868,420 | 2/1999 | Higashiura et al. ................ 280/743.1 |
| 5,895,070 | 4/1999 | Crimmins et al. ................ 280/730.1 |

Primary Examiner—Eric Culbreth
Attorney, Agent, or Firm—Tarolli, Sundheim, Covell, Tummino & Szabo L.L.P.

[57] ABSTRACT

A side impact air bag (12) has a head portion (60) for, when inflated, helping to protect the head of the vehicle occupant (14) and a torso portion (50) for, when inflated, helping to protect the torso of the vehicle occupant. A housing assembly (20) supports the inflatable device (12) on a vehicle (16). When the inflatable device (12) is in the deflated condition, the head portion (60) is turned at least partially inside out and received inside the torso portion (50). The head portion (60) is the final portion of the inflatable device (12) to inflate. The inflatable device (12) has a first partially inflated condition in which the torso portion (50) is inflated forward from the housing assembly (20) and the head portion (60) is uninflated and inside the torso portion. The inflatable device (12) has a second partially inflated condition in which the torso portion (50) is inflated forward from the housing assembly (20) and the head portion (60) is substantially fully inflated outward from the torso portion in a direction forward and upward from the torso portion. The inflatable device (12) has a fully inflated condition in which the head portion (60) extends upward and rearward from the torso portion (50).

10 Claims, 4 Drawing Sheets

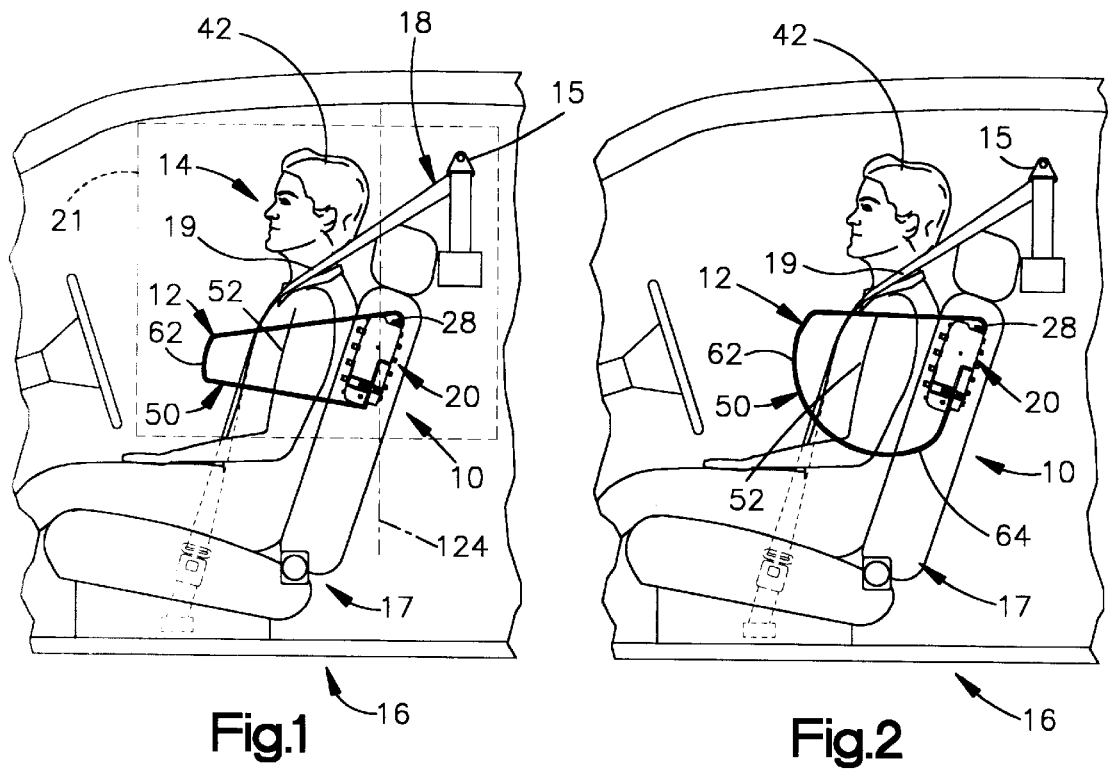
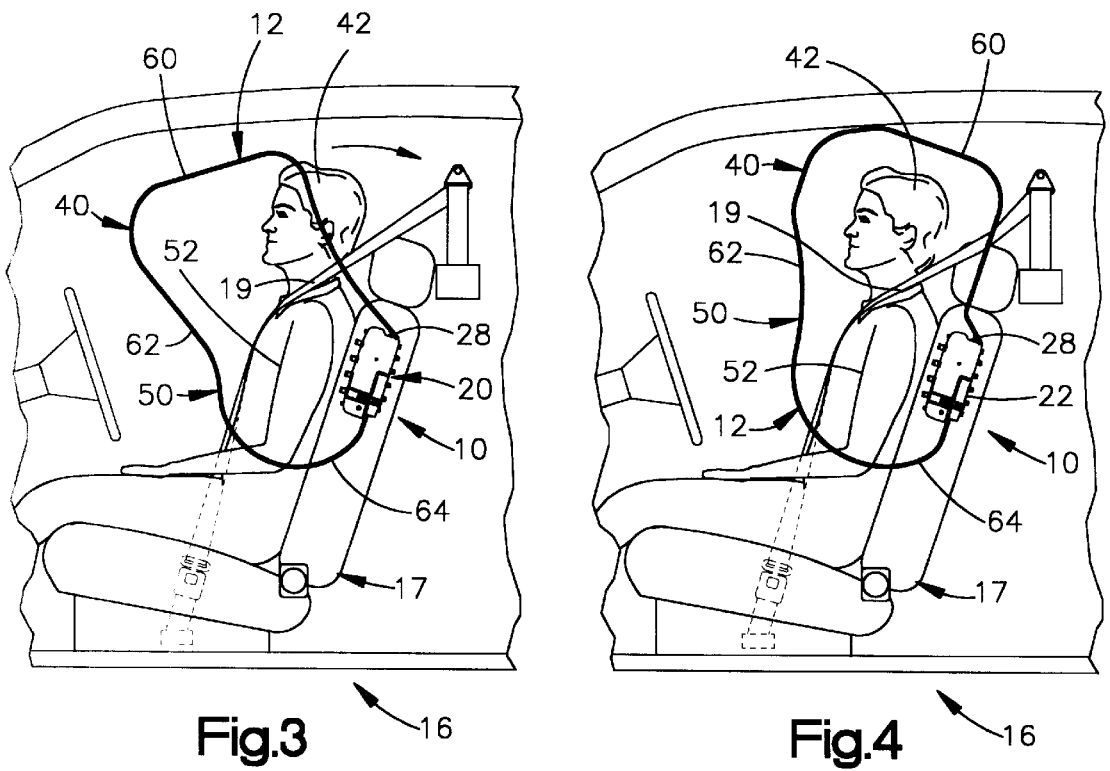

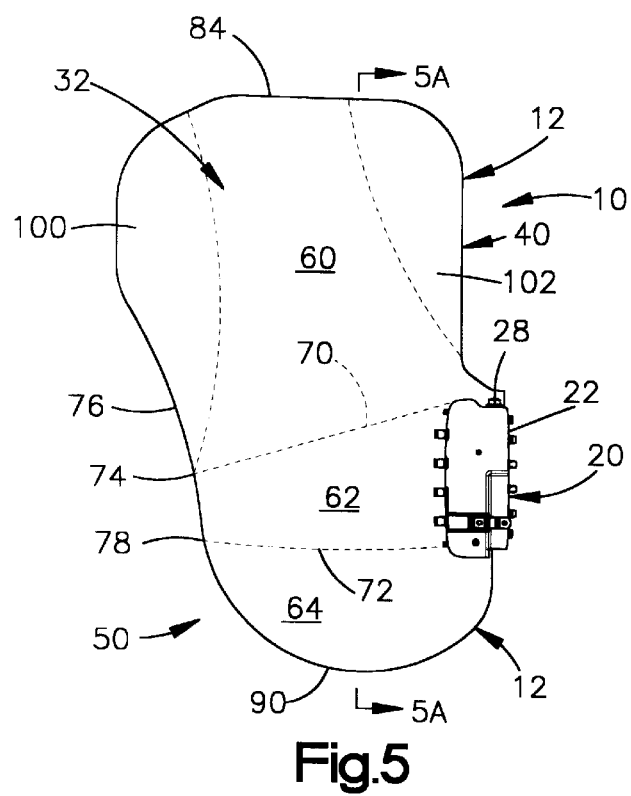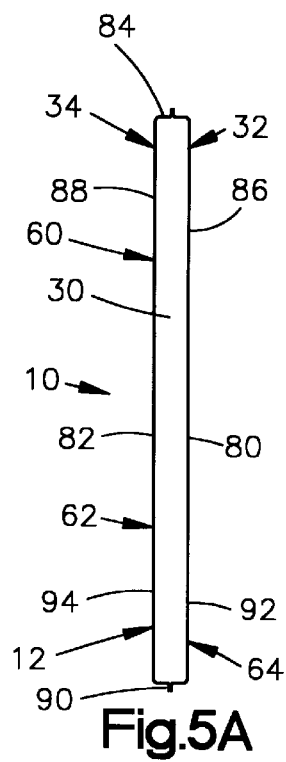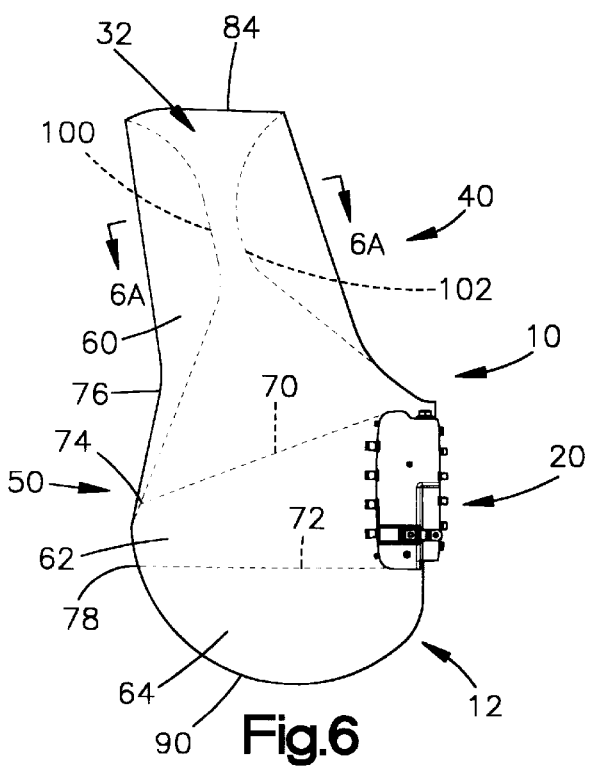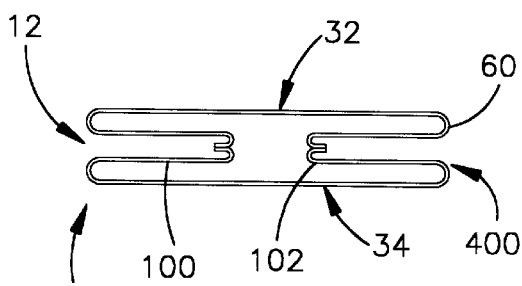

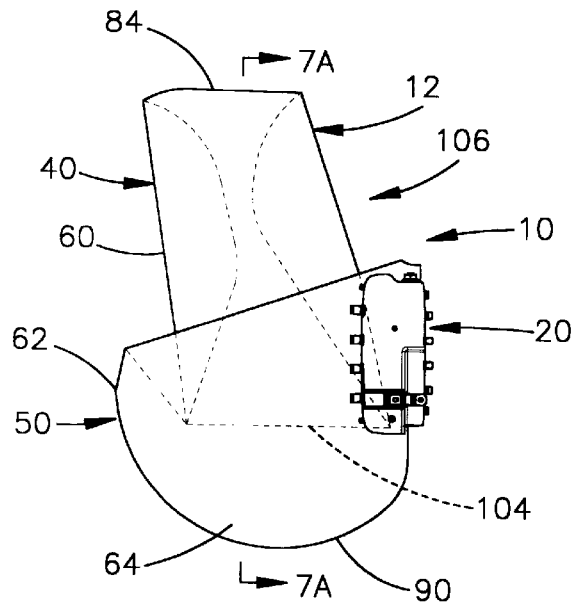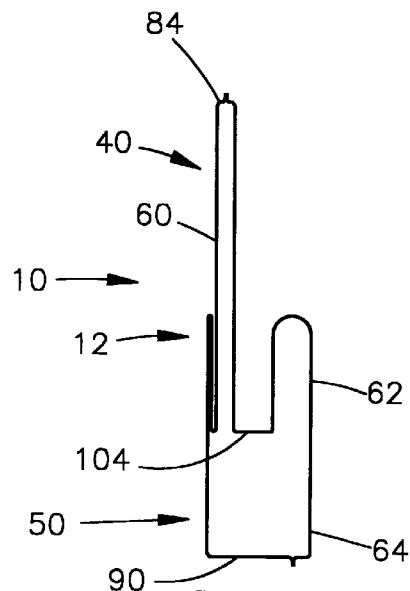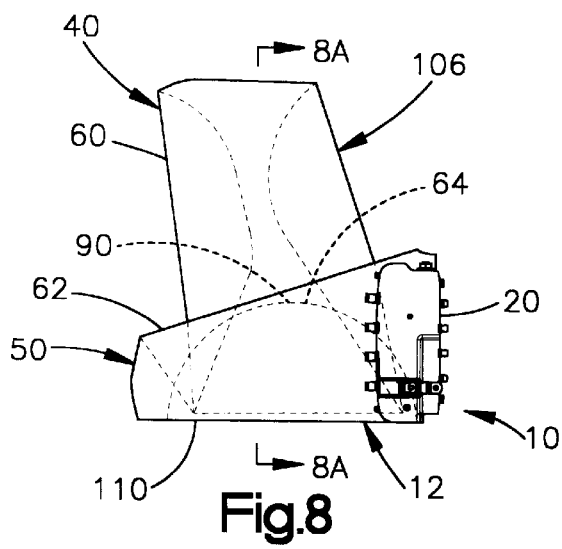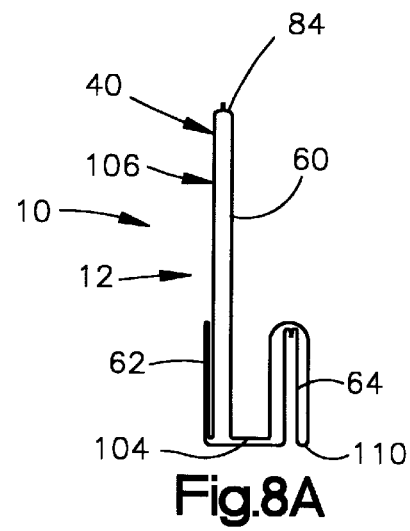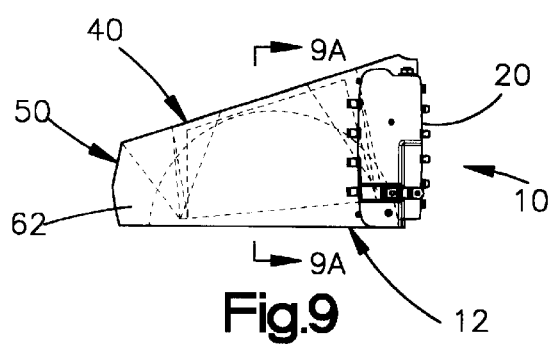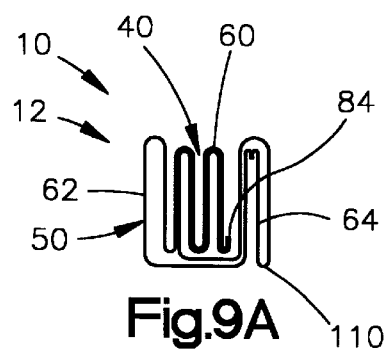

SIDE IMPACT AIR BAG

BACKGROUND OF THE INVENTION

1. Technical Field

The present invention relates to an inflatable vehicle occupant restraint, such as an air bag, that is inflatable to protect an occupant of a vehicle. In particular, the present invention relates to a side impact air bag that is folded and that inflates in a manner to avoid engaging a seat belt.

2. Description of the Prior Art

An air bag for protecting an occupant of a vehicle in the event of a side impact to the vehicle is commonly supported in a deflated condition at a location in the vehicle such as the occupant's seat or the adjacent door of the vehicle. An inflator associated with the air bag is actuated to inflate the air bag when needed to help protect the vehicle occupant. It is preferable that a side impact air bag, when inflating, not brush against the head or upper torso of a vehicle occupant. It is also preferable that the inflating air bag not engage the shoulder portion of the occupant's seat belt.

SUMMARY OF THE INVENTION

The present invention is a vehicle safety apparatus comprising an inflatable vehicle occupant protection device having a deflated condition and an inflated condition for helping to protect an occupant of a vehicle in the event of a side impact to the vehicle. A housing assembly supports the inflatable device on the vehicle.

The inflatable device when in the deflated condition has the head portion turned at least partially inside out and received inside the torso portion. The head portion is the final portion of the inflatable device to inflate when the inflatable device is inflated.

The inflatable device has a first partially inflated condition in which the torso portion is inflated forward from the housing assembly and the head portion is uninflated and inside the torso portion. The inflatable device has a second partially inflated condition in which the torso portion is inflated forward from the housing assembly and the head portion is substantially fully inflated outward from the torso portion in a direction forward and upward from the torso portion. The inflatable device has a fully inflated condition in which the head portion of the inflatable device extends upward and rearward from the torso portion.

BRIEF DESCRIPTION OF THE DRAWINGS

The foregoing and other features of the present invention will become apparent to one of ordinary skill in the art to which the present invention relates upon consideration of the following description of the invention with reference to the accompanying drawings, wherein:

FIGS. 1 through 4 are a series of schematic views illustrating a vehicle safety apparatus in accordance with the present invention including an air bag inflating in a vehicle;

FIG. 5 is a side elevational view of the air bag of FIG. 1 in a deflated and unfolded condition;

FIG. 5A is a schematic sectional view of the partially folded air bag of FIG. 5, taken along line 5A—5A of FIG. 5;

FIG. 6 is a view similar to FIG. 5 of the air bag after an initial fold of the air bag;

FIG. 6A is a schematic sectional view of the partially folded air bag of FIG. 6, taken along line 6A—6A of FIG. 6;

FIG. 7 is a view similar to FIG. 6 of the air bag after a subsequent fold of the air bag;

FIG. 7A is a schematic sectional view of the partially folded air bag of FIG. 7, taken along line 7A—7A of FIG. 7;

FIG. 8 is a view similar to FIG. 7 of the air bag after a subsequent fold of the air bag;

FIG. 8A is a schematic sectional view of the partially folded air bag of FIG. 8, taken along line 8A—8A of FIG. 8;

FIG. 9 is a view similar to FIG. 8 of the air bag after a subsequent fold of the air bag;

FIG. 9A is a schematic sectional view of the partially folded air bag of FIG. 9, taken along line 9A—9A of FIG. 9;

DESCRIPTION OF A PREFERRED EMBODIMENT

Figure 10:
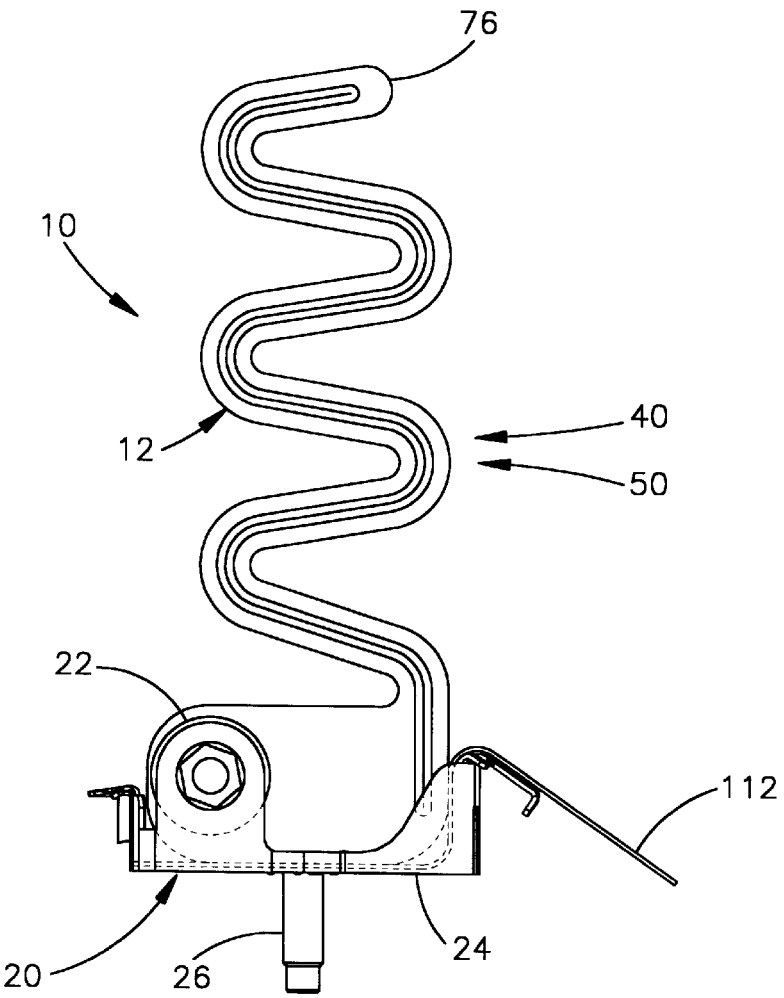
FIG. 10 is a schematic view showing a final step in the folding of the air bag.

The present invention relates to an inflatable vehicle occupant protection device, such as an air bag, that is inflatable to help protect an occupant of a vehicle. The present invention is applicable to various inflatable protection device constructions. As representative of the present invention, FIG. 1 illustrates a vehicle safety apparatus 10 that includes a specific inflatable vehicle occupant protection device, i.e., an air bag 12. The air bag 12 is inflatable to help protect an occupant 14 of a vehicle 16 in the event of a side impact to the vehicle or a rollover condition of the vehicle.

The vehicle 16 includes a seat 17, indicated as a driver's seat, on which the occupant 14 is seated. The vehicle 16 also includes a seat belt system 18 for the occupant of the seat 17. The seat belt system 18 includes a shoulder portion or torso portion 19 of belt webbing that extends from a D-ring 15 across the occupant's torso when the seat belt system is engaged. The shoulder portion 19 of the belt webbing is disposed between the vehicle left side structure 21 and the occupant's head and torso. The left side structure 21, disposed out of the plane of the paper as viewed in FIGS. 1–4, is removed for clarity and thus shown only schematically.

Figure 11:
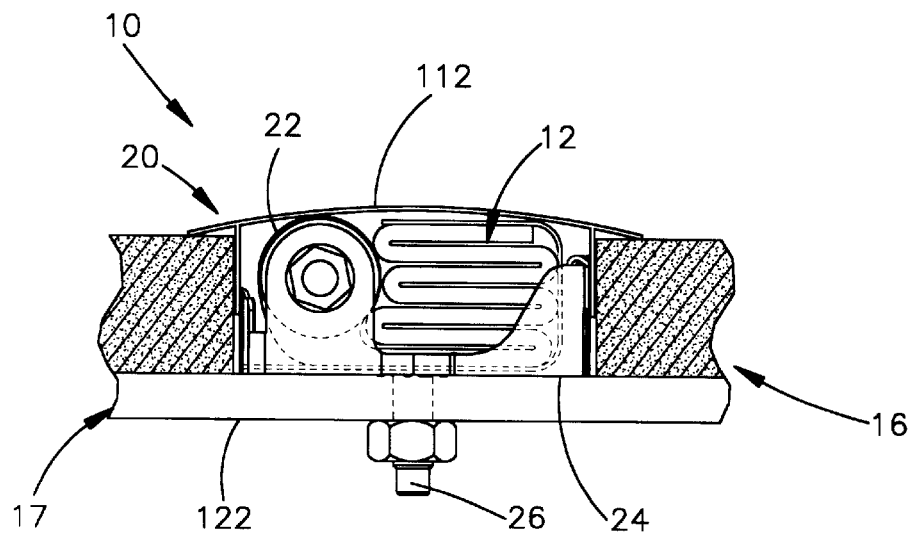
FIG. 11 is a partial sectional view showing the folded air bag mounted as part of a module in the vehicle seat.

The safety apparatus 10 includes, in addition to the air bag 12, a housing assembly 20 (FIGS. 10 and 11). The housing assembly 20 includes an inflator 22 and a housing 24. The inflator 22 is of a known construction and therefore is not described in detail.

The housing 24 is a box-shaped metal structure having an internal volume for receiving the inflator 22 and the air bag 12 when folded. The housing 24 includes one or more module mounting bolts 26 for mounting the housing assembly 20 on the vehicle seat 17, thereby to support the air bag 12 on the vehicle 16.

The housing assembly 20 includes a plurality of fasteners for securing the air bag 12 to the housing 24. One of these fasteners is an upper bag securing bolt 28 (FIGS. 1 and 5). The upper bag securing bolt 28 projects from the top, rear portion of the housing assembly 20.

The air bag 12 (FIGS. 5 and 5A) includes two layers of a material (preferably a fabric such as woven nylon) that define between them an inflation volume 30 into which an inflation fluid is directed to inflate the air bag. The two layers include an inner panel 32, which is disposed closest to the vehicle occupant when the air bag 12 is inflated, and an outer panel 34, which is disposed farthest from the vehicle occupant when the air bag is inflated. The inner and outer panels 32 and 34 may be separate fabric pieces sewn together, or may be formed as one piece of fabric.

The air bag 12 includes a head portion 40 for helping to protect the head 42 of the vehicle occupant 14 and a torso portion 50 for helping to protect the torso 52 of the vehicle occupant. The head portion 40 of the air bag 12 includes an upper section 60 of the air bag. The torso portion 50 of the air bag 12 includes a middle section 62 and a lower section 64 of the air bag.

The middle section 62 of the air bag 12 is that portion of the air bag that extends between two imaginary lines 70 and 72. The imaginary line 70 extends forward (to the left as viewed in FIG. 5) from the upper end of the housing assembly 20. The imaginary line 70 terminates at a point 74 on the forward edge 76 of the air bag 12. The imaginary line 72 extends forward (to the left as viewed in FIG. 5) from the lower end of the housing assembly 20. The imaginary line 72 terminates at a point 78 on the forward edge 76 of the air bag 12, below the point 74. The middle section 62 of the air bag 12 includes a middle portion 80 of the inner panel 32 and a middle portion 82 of the outer panel 22.

The upper section 60 of the air bag 12 is located above the middle section 62 when the air bag 12 is unfolded as in FIG. 4 (shown inflated) or in FIG. 5 (shown uninflated). The upper section 60 of the air bag 12 extends between the imaginary line 70 and the upper edge 84 of the air bag. The air bag upper section 60 includes an upper portion 86 of the inner panel 32 and an upper portion 88 of the outer panel 34.

The lower section 64 of the air bag 12 is disposed below the middle section 62 when the air bag is unfolded as in FIG. 4 (shown inflated) or in FIG. 5 (shown uninflated). The lower section 64 extends from he imaginary line 72 to the lower edge 90 of the air bag 12. The air bag lower section 64 includes a lower portion 92 of the inner panel 32 and a lower portion 94 of the outer panel 34. The air bag 12 preferably includes a plurality of internal tethers (not shown) extending inside the air bag 12 between the inner panel 32 and the outer panel 34 for limiting the lateral thickness of the air bag when inflated.

For mounting in the vehicle 16, the air bag 12 is first folded in the manner illustrated in FIGS. 6 and 7. In this initial fold, a forward edge portion 100 of the upper section 60 of the air bag 12 is, in effect, turned "inside out" and folded rearward ("tucked") inside the upper section of the air bag. Also, a rear edge portion 102 of the upper section 60 of the air bag 12 is turned "inside out" and folded forward ("tucked") inside the upper section of the air bag. The air bag 12 is then in the partially folded condition shown in FIGS. 6 and 6A.

The upper section 60 of the air bag 12 is then partially turned "inside out" and tucked or moved downward partially into the middle section 62 of the air bag until a fold line 104 is formed at the location of the imaginary line 72, that is, at the lower end of the housing assembly 20. The air bag 12 is then in the partially folded condition shown in FIGS. 7 and 7A. In this condition, a portion 106 of the upper section 60 of the air bag 12 still projects upward from the middle section 62 of the air bag.

The lower section 64 of the air bag 12 is then turned "inside out" and tucked or moved upward into the middle section 62 until a fold line 110 is formed at the location of the imaginary line 72, that is, at the lower end of the housing assembly 20. The air bag 12 is then in the partially folded condition shown in FIGS. 8 and 8A.

Next, the projecting portion 106 of the upper section 60 of the air bag 12 is accordion folded into the middle section 62 of the air bag as shown in FIGS. 9 and 9A. The entire head portion 40 of the air bag 12, that is, the upper section 60, is thus received inside the torso portion 50 (specifically, inside the middle section 62). When the air bag 12 is in this condition, it extends forward from the housing assembly 20 as shown in FIG. 9.

The air bag 12 is then accordion folded rearward into the housing 24, as shown in FIGS. 10 and 11, adjacent the inflator 22. A flap 112 is folded over to enclose the folded air bag 12 in the housing 24.

The safety apparatus 10 is mounted in the vehicle seat 17 as shown in FIGS. 11 and 1–4. The module mounting bolts 26 secure the safety apparatus 10 to a portion of the vehicle seat 17 such as the frame 122. The safety apparatus 10 is preferably mounted on the seat 17 so that when the seatback is reclined a typical amount of about 20 degrees, the inflator 22 extends at an angle of about 20° to 10° from an imaginary vertical line 124 (FIG. 1). The upper bag securing bolt 28 is located at the top and rear of the safety apparatus 10.

In the event of a vehicle emergency situation for which inflation of the air bag 12 (FIG. 1) is desired to help protect the vehicle occupant 14, the inflator 22 is actuated, in a known manner, to direct inflation fluid into the air bag. The inflation fluid flows from the inflator 22 and into the inflation fluid volume 30 between the inner panel 32 and the outer panel 34 of the air bag.

The air bag 12 unfolds as it inflates, in a manner partially the reverse of the folding process shown in FIGS. 5–11. Specifically, the air bag 12 first unfolds and inflates in a forward direction in the vehicle 16, in a step that is basically the reverse of the accordion folding step of FIG. 10. This forward movement of the air bag 12 occurs without any significant upward movement of the air bag. The air bag 12 is then in the partially inflated condition shown in FIG. 1. In this condition, the air bag 12 extends forward from the housing assembly 20, having substantially the configuration (as viewed in FIG. 1) of the middle section 62 of the air bag.

The next portion of the air bag 12 to inflate is the lower section 64. The lower section 64 (FIG. 2) moves down and away from its folded position within the middle section 62. The lower section 64 of the air bag 12 moves vertically down out of the middle section 62, and the air bag 12 is in the partially inflated condition shown in FIG. 2. In this condition, the torso portion 50 of the air bag 12 is inflated forward from the housing assembly 20, and the head portion 40 is uninflated and still tucked inside the torso portion 50.

The next and final portion of the air bag to inflate is the upper section 60. The upper section 60 pops out from the middle section 62 as shown in FIG. 3. The upper section 60 moves up and forward from its folded (tucked) position within the middle section 62.

The air bag 12 is then in a partially inflated condition in which the torso portion 50 of the air bag is inflated forward from the housing assembly 20, and the head portion 40 is substantially fully inflated outward from the torso portion in a direction forward and upward from the torso portion.

Thereafter, the upper section 60 of the air bag 12 rotates rearward as it finishes unfolding and inflating to the final position shown in FIG. 4. The air bag 12 assumes a fully inflated condition in which the head portion 40 of the air bag extends upward and rearward from the torso portion 50. The head portion 40 is then located between the occupant's head and the vehicle side structure 21.

This sequential inflation of the upper section 60 of the air bag 12, forward then with subsequent rearward rotation, reduces the chance that the air bag may engage the shoulder portion 19 of the seat belt webbing while the air bag is inflating. This undesirable belt contact is avoided because the upper section 60 of the air bag primarily inflates when it is forward, away from the shoulder belt 19.

The rearward rotation of the upper section 60 of the air bag 12 does, however, begin before the upper section is fully untucked. The air bag 12 then inflates fully, a short while before the rearward rotation of the upper section 60 is completed.

The rearward rotation of the upper section 60 of the air bag 12 occurs because of the manner in which the air bag is tuck folded and mounted in the housing 24. Because the air bag 12 when tuck folded is located below its uppermost mounting point (the upper bag securing bolt 28), the air bag naturally moves upward as it inflates. But because the air bag 12 inflates forward first, as it continues thereafter to inflate, it must move rearward to assume its final inflated position.

The pivot point for the rotation of the inflating air bag 12 is the area adjacent to the upper bag securing bolt 28. This is the area of the air bag 12 that is not tucked or folded and that is fixed to the housing assembly 20. Most other portions of the air bag 12 move upward relative to this portion as they inflate, but this portion of the air bag does not, so this portion becomes, effectively, the pivot point.

The air bag 12 inflates substantially in a vertical plane. There is little or no lateral (inboard-outboard or outboard-inboard) movement of air bag 12 as it unfolds and inflates. For example, the tuck folding of the upper section 60 into the middle section 62 means that the upper section pops out vertically from the middle section and does not have to unfold laterally to inflate. Thus, there is little or no lateral movement of the air bag 12 as it inflates.

From the above description of the invention, those skilled in the art will perceive improvements, changes and modifications in the invention. Such improvements, changes and modifications within the skill of the art are intended to be covered by the appended claims.

Having described the invention I claim:

1. A vehicle safety apparatus comprising:

an inflatable vehicle occupant protection device having a deflated condition and an inflated condition for helping to protect an occupant of a vehicle in the event of a side impact to the vehicle, said inflatable device having a head portion for when inflated helping to protect the head of the vehicle occupant and a torso portion for when inflated helping to protect the torso of the vehicle occupant;

a housing assembly for supporting said inflatable device on the vehicle;

said inflatable device when in the deflated condition having said head portion turned at least partially inside out and received inside said torso portion, said head portion being the final portion of said inflatable device to inflate when said inflatable device is inflated;

said inflatable device having a first partially inflated condition in which said torso portion is inflated forward from the housing assembly and said head portion is uninflated and inside said torso portion;

said inflatable device having a second partially inflated condition in which said torso portion is inflated forward from the housing assembly and said head portion is substantially fully inflated outward from said torso portion in a direction forward and upward from said torso portion;

said inflatable device having a fully inflated condition in which said head portion of said inflatable device extends upward and rearward from said torso portion.

2. A safety apparatus as set forth in claim 1 wherein said head portion of said inflatable device rotates rearward during movement of said inflatable device from the second partially inflated condition to the fully inflated condition.

3. A safety apparatus as set forth in claim 2 wherein a rear upper portion of said inflatable device is fixed to said housing assembly and forms a pivot point for the rearward rotation of said head portion of said inflatable device.

4. A safety apparatus as set forth in claim 1 wherein said inflatable device has an upper section, a middle section, and a lower section, said upper section forming said head portion of said inflatable device, said middle section and said lower section forming said torso portion of said inflatable device.

5. A safety apparatus as set forth in claim 4 wherein said lower section of said inflatable device is turned inside out and received inside said middle section, said lower section inflating prior to said upper section inflating.

6. A safety apparatus for helping to protect an occupant of a seat of a vehicle in the event of a side impact to the vehicle, the vehicle having a side structure outboard of the vehicle seat, said apparatus comprising:

a shoulder belt extensible between the vehicle side structure and the seat and across the shoulder and torso of an occupant of the seat;

an inflatable vehicle occupant protection device having a deflated condition and an inflated condition for helping to protect the vehicle occupant, said inflatable device having a head portion for when inflated helping to protect the head of the vehicle occupant and a torso portion for when inflated helping to protect the torso of the vehicle occupant;

a housing assembly for supporting said inflatable device on the vehicle adjacent said shoulder belt;

said inflatable device when in the deflated condition having said head portion turned at least partially inside out and received inside said torso portion, said head portion being the final portion of said inflatable device to inflate when said inflatable device is inflated;

said inflatable device having a first partially inflated condition in which said torso portion is inflated forward from the housing assembly at a location forward of said shoulder belt, said head portion being substantially uninflated inside said torso portion;

said inflatable device having a second partially inflated condition in which said head portion is substantially fully inflated out of said torso portion in a direction forward and upward from said torso portion and forward of said shoulder belt; and said inflatable device having a fully inflated condition in which said head portion of said inflatable device extends upward and rearward from said torso portion at a location laterally between the shoulder belt and the side structure of the vehicle.

7. A safety apparatus as set forth in claim 6 wherein said head portion of said inflatable device rotates rearward during movement of said inflatable device from the second partially inflated condition to the fully inflated condition, said head portion while rotating being disposed between said shoulder belt and the vehicle side structure.

8. A safety apparatus as set forth in claim 7 wherein a rear upper portion of said inflatable device is fixed to said housing assembly and forms a pivot point for the rearward rotation of said head portion of said inflatable device.

9. A safety apparatus as set forth in claim 6 wherein said inflatable device has an upper section, a middle section, and a lower section, said upper section forming said head portion of said inflatable device, said middle section and said lower section forming said torso portion of said inflatable device.

10. A safety apparatus as set forth in claim 9 wherein said lower section of said inflatable device is turned inside out and received inside said middle section, said lower section inflating prior to said upper section inflating.

\* \* \* \* \*